United States Patent [19]
Halasa

[11] 3,879,367
[45] Apr. 22, 1975

[54] PRODUCTION OF CRYSTALLINE, HIGH-VINYL POLYBUTADIENE

[75] Inventor: Adel Farhan Halasa, Bath, Ohio

[73] Assignee: The Firestone Tire & Rubber Company, Akron, Ohio

[22] Filed: Nov. 19, 1973

[21] Appl. No.: 417,175

[52] U.S. Cl............................. 260/94.3; 260/94.2 R
[51] Int. Cl.................................................. C08d 1/4
[58] Field of Search..... 260/94.3; 252/429 R, 429 C

[56] References Cited
UNITED STATES PATENTS 3,026,269  3/1962  Gresham et al................ 260/94.3 X
3,652,529  3/1972  Judy et al. ........................ 260/94.3

Primary Examiner—William F. Hamrock

[57] ABSTRACT

Crystalline polybutadiene of high vinyl content and high purity is produced by using as a catalyst for the butadiene polymerization, tungsten oxychloride ($WOCl_4$) or tungsten dioxychloride ($WO_2Cl_2$) with a trialkyl or triaryl aluminum modifier. The product contains cyclic polybutadiene, and products molded from such polybutadiene do not shrink when molded.

3 Claims, 1 Drawing Figure

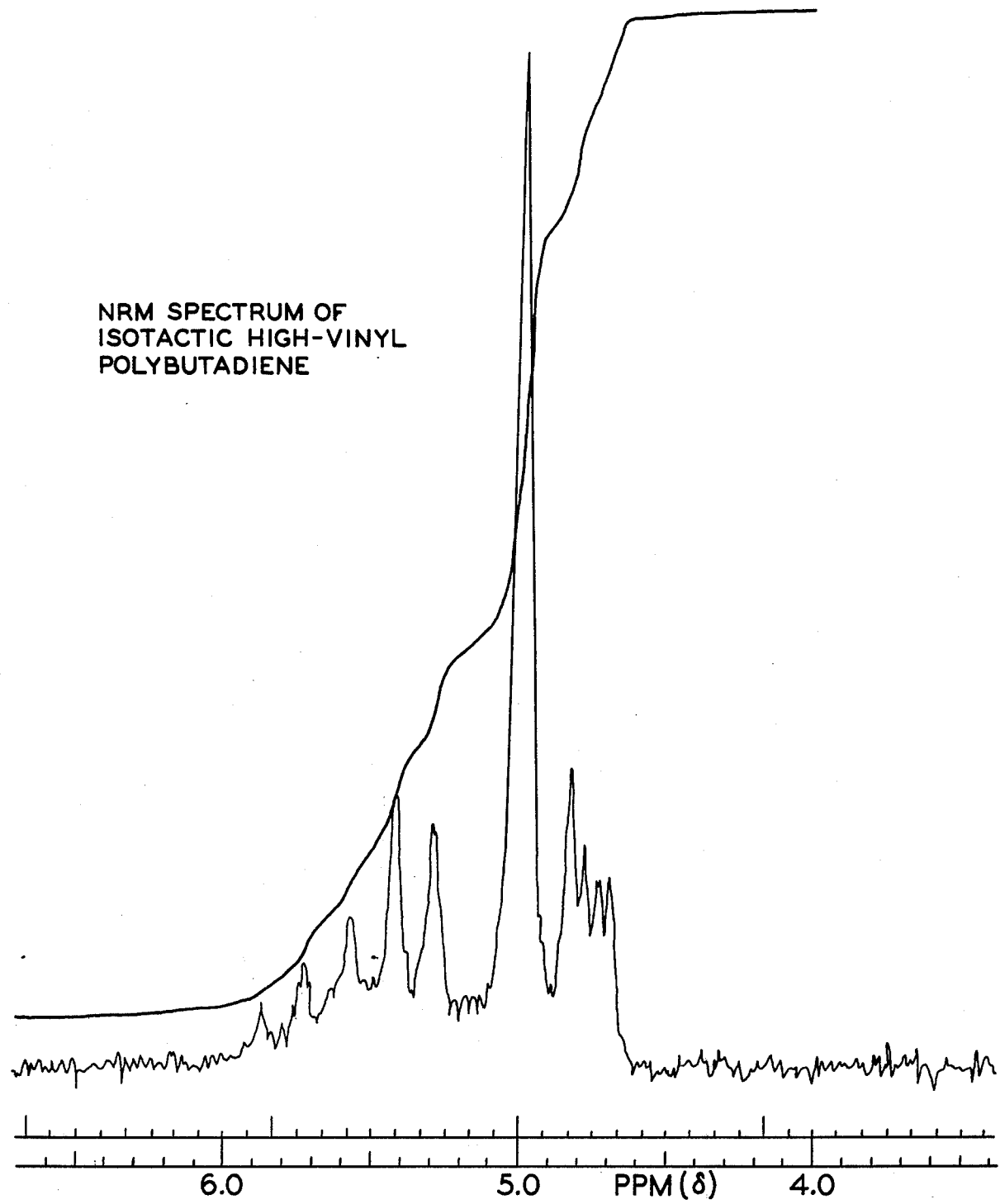

PRODUCTION OF CRYSTALLINE, HIGH-VINYL POLYBUTADIENE

The invention relates to crystalline polybutadiene of high vinyl content and high purity which is produced by using as a catalyst for the butadiene-1,3 polymerization, tungsten oxychloride ($WOCl_4$) or tungsten dioxychloride ($WO_2Cl_2$) with a trialkyl or triaryl aluminum modifier.

High-vinyl polybutadiene has been made by a number of methods as, for example, (a) by the use of organolithium catalysts in conjunction with polar modifiers, such as an amine or ether which produces high-vinyl polybutadiene which contains a mixture of atactic, isotactic and syndiotactic structures, but it is not crystalline, and these products are in many cases low-molecular weight oils rather than crystalline, or even amorphous, solids; (b) by the use of transition metals with organoaluminum compounds, especially transition metals of the third, fourth and fifth groups. Such polymers are described in various articles and patents by Natta and his coworkers as, or instance MACROMOLECULAR CHEMISTRY in SCIENCE for January 1965, pages 261–272; British Pat. No. 854,615; Italian Pat. Nos. 682,423, 599,661, 563,507 and 538,453; French Pat. No. 1,493,422; and Japanese Pat. Nos. 23,356 and 15,661.

Thus, the prior art comprises various disclosures of the preparation of high-vinyl polybutadiene but there is no disclosure of a process that yields directly 90 to 100 percent of crystalline 1,2-polybutadiene. In many of the processes of the prior art, the product has to be fractionated by hydrocarbon solvent to separate the desired product, as in the process described by Natta in JOURNAL OF POLYMER SCIENCE, 20, pages 251–266 (1956). This process is very tedious and non-commercial.

Attention is called to U.S. Pat. No. 3,652,529, recently issued to Judy et al., which discloses a process of producing polybutadiene of at least 60 percent vinyl content by using as a mixed catalyst: (1) an organoaluminum compound, (2) tungsten oxychloride, and (3) a nickel salt or an organo complex compound of nickel. The products of this invention are oils, or if they are solids they are not crystalline but are rubbery and not free-flowing.

According to this invention, crystalline high-vinyl polybutadiene of greater than 90 percent purity is produced directly by using a tungsten oxychloride, either $WOCl_4$ or $WO_4Cl_2$, in combination with trialkylaluminum or triarylaluminum as a reducing agent. The alkyl group may contain 1 to 8 carbon atoms. This mixed catalyst yields polybutadiene with a vinyl content greater than 90 percent, and greater than 90 percent of the vinyl structure is crystalline. Such product is superior as a molding material because molded products made from it do not shrink during molding.

The trialkyl- or triarylaluminum compound used as the reducing agent in the catalyst composition is of the following structure:

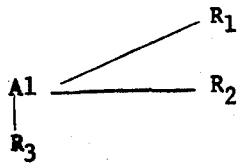

in which $R_1$ is selected from the group consisting of alkyl (including cycloalkyl), aryl, alkylaryl, arylalkyl or hydrogen, $R_2$ and $R_3$ being selected from the group consisting of alkyl, alkylaryl and arylalkyl. In the foregoing, alkyl may comprise 2 to 8 carbon atoms and aryl groups consist of phenyl and naphthyl and methyl derivatives thereof, including tolyl, xylyl and the methyl naphthyls. Representative alkyl groups include triethyl and tri-n-propyl and tri-n-octyl and tricyclohexyl and tri-n-butyl aluminum, triisobutyl aluminum being preferred.

The second catalyst component is tungsten oxychloride or tungsten dioxydichloride, and tungsten hexachloride may be used.

High 1,2-polybutadiene has thermal stability and is particularly useful for blending with rubbers and non-rubber plastics, as is known in the high-vinyl polybutadiene art. A preferred compound for such use is the 1,2-polybutadiene of 90 percent or better of crystalline content, prepared by the process of this disclosure.

It is imperative to have a crystalline, high vinyl-polybutadiene of at least 90% purity for the manufacture of packaging film and other plastic goods because it is a photosensitive product which can be easily photo-degraded by sunlight. Due to the ecology-conscious public, there is a demand for such material. It becomes hard and brittle on exposure to sunlight so that it can be ground into powdery material usable for land filling.

The following represents a typical procedure:

Example

Benzene was distilled from sodium into dried cooled bottles containing calcium hydride. Butadiene was distilled from sodium fluorene into the polymerization bottles. Triisobutylaluminum was used as received from Texas Alkyl Company (20% by weight triisobutylaluminum). Tungsten oxychloride was prepared by reacting tungsten oxide with excess thionyl chloride, evaporating to dryness and subliming the scarlet tungsten oxychloride from the mixture of products ($WOCl_4$ and $WO_2Cl_2$). Solutions of tungsten oxychloride which were prepared in benzene contained 0.006mM. of $WOCl_4$ per milliliter of benzene. Biphenyl ether was stored over calcium hydride and used without further purification.

Polymerizations were carried out in 7 oz. polymerization bottles. Butadiene (20 grams) was distilled from sodium fluorene, 0.15 cc. (0.12 mM.) of the triisobutylaluminum and 0.2 ml. (0.12 mM.) of diphenyl ether were then added, the bottle was cooled in an ice bath and 20 cc. (0.12 mM.) of the benzene-tungsten oxychloride solution was added. The color of the solution was reddish-brown and upon standing at room temperature for 7 days became green. The concentration of the butadiene in the polymerization mixture was about 50% by weight.

The drawing is the NMR spectrum of the polymer. It shows absorption peaks between 4 and 6 ppm. These peaks are characteristic of the vinyl protons. It is interesting to note that the fine splittings are characteristic of isostatic polybutadiene, particularly the fine splitting between 5 and 6 ppm.

Tungsten dioxychloride, $WO_2Cl_2$, may be substituted for the $WOCl_4$. About 2 to 5 millimoles of either tungsten compound (or a mixture of them) is added per 100 gram of the butadiene. The chloride may be replaced by other halide such as bromide or iodide.

The molar ratio of the tungsten oxy- or dioxy-chloride to the trialkyl aluminum may be 1:1 to 1:10. Other trialkyl aluminum compounds such as triethyl, tributyl, and tri-n-butyl aluminum, etc. may be used.

The temperature for commercial production will generally be about 0° to 30° C., although higher temperatures up to 50° C. and above may be used. A usual aromatic solvent may be used such as benzene, toluene, xylene, etc.

Diphenyl ether and hexamethylphosphotriamide (HMPA), etc. may be used as modifers. Ten to 100 weight percent of diphenyl ether ($Ph_2O$) per the combined weight of the tungsten oxychloride and the trialkyl or triaryl aluminum has been found to increase the tacticity of the polymer and, in some cases, to give high conversions.

The following table is illustrative of results obtainable with different modifiers using 5 weight percent of $WOCl_4$ and triisobutylaluminum (TIBAl) in a molar ratio of 1/10, in benzene, with and without a small percent of diphenyl ether (DE) and HMPA.

The following Table I gives details of the polymerization of 1,3-butadiene using triisobutyl aluminum. $WOCl_4$ as catalyst in the ration Al/W=1.20. Seven millimoles of catalyst were used per 100 grams of monomer.

TABLE I

| Cis-1,4 | Trans-1,4 | 1,2 | MODIFIERS | TEMPERATURE |
|---|---|---|---|---|
| 3.3 | 6.9 | 89.9 | 0 | 50° C. |
| 2.3 | 3.2 | 94.6 | 0 | 30° C. |
| 1.9 | 7.1 | 91.1 | 0 | 30° C. |
| 2.0 | 5.7 | 92.2 | HMPA 1mM. | 30° C. |

TABLE I—Continued

| Cis-1,4 | Trans-1,4 | 1,2 | MODIFIERS | TEMPERATURE |
|---|---|---|---|---|
| 2.7 | 32.6 | 64.7 | D.E.1mM. | 80° C. |
| — | — | 90.2 | D.E.2mM. | 30° C. |

Table II gives the results of using different A/W ratios from 0.99 to 1.25. The 1,2-content of the product ranged from 82% to 93%. The addition of diphenyl ether as a modifier increased the tacticity in the polymer and the product was crystalline and free flowing with a melting point of 150° – 155° C.

TABLE II

PREPARATION OF ISOTACTIC 1,2 POLYBUTADIENE

| mm.Al/mm.W* | mm.De/mm.Al** | Temperature | 1,2 | Cis-1,4 | Trans-1,4 | Conversion |
|---|---|---|---|---|---|---|
| 0.99 | — | 50°C. | 89.4 | 4.9 | 5.7 | 7 |
| 0.99 | 1.7 | 50°C. | 89.3 | 3.7 | 7.0 | 30 |
| 0.99 | 3.4 | 50°C. | 83.3 | 8.7 | 8.0 | 52 |
| 0.62 | — | 50°C. | 89.8 | 4.8 | 5.3 | 11 |
| 0.62 | 4.5 | 50°C. | 89.7 | 4.0 | 6.3 | 10 |
| 1.25 | — | 50°C. | 87.6 | 4.3 | 8.4 | 48 |
| 1.25 | 2.2 | 50°C. | 87.3 | 4.6 | 8.4 | 41 |
| 1.25 | 2.2 | 50°C. | 87.0 | 2.9 | 8.4 | 30 |
| 0.99 | 1.7 | 30°C. | 93.0 | 2.9 | 3.8 | 5 |
| 0.99 | 3.4 | 30°C. | 90.2 | 4.2 | 5.6 | 26 |
| 0.62 | — | 30°C. | 88.2 | 7.6 | 4.4 | 14 |
| 1.25 | — | 30°C. | 92.0 | 3.4 | 4.4 | 23 |
| 1.25 | 1.1 | 30°C. | 82.0 | 12.8 | 5.3 | 14 |
| 1.25 | 2.2 | 30°C. | 89.9 | 4.1 | 6.0 | 6 |

*Catalyst used 1–7 mM per 100 grams of monomer.
**De = diphenyl ether used as modifier.

I claim:

1. In the method of producing polybutadiene of high vinyl content and a high degree of crystallinity by treating butadiene, -1,3 with a catalyst in solution in an aromatic solvent, the improvement in which the catalyst is a mixture of (1) 1 to 10 mM. of $AlR_1R_2R_3$ in which $R_1$ is selected from the group consisting of alkyl, arylalkyl, alkylaryl groups and hydrogen and $R_2$ and $R_3$ are selected from the class consisting of alkyl, arylalkyl and alkylaryl groups, and phenyl and napthyl groups and methyl derivatives thereof; each alkyl group containing 2 to 8 carbon atoms and (2) 0.1 to 5 mM. of a compound of the class consisting of tungsten oxychloride and tungsten dioxychloride, per 100 grams of butadiene -1,3.

2. The process of claim 1 in which the catalyst is a mixture of triisobutylaluminum and the tungsten compound.

3. The process of claim 1 in which the solution is a benzene solution and the catalyst is a mixture of 1 to 1.5 mM. of triisobutylaluminum and 0.1 to 1 mM. of tungsten oxychloride per 100 grams of butadiene -1,3 at temperature of 0° to 30° C.

* * * * *

PO-1050
(5/69)

UNITED STATES PATENT OFFICE
CERTIFICATE OF CORRECTION

Patent No. 3,879,367     Dated April 22, 1975

Inventor(s) ADEL FARHAN HALASA

It is certified that error appears in the above-identified patent and that said Letters Patent are hereby corrected as shown below:

In Column 1, Line 51, "$WO_4Cl_2$" should read --$WO_2Cl_2$--.

In Column 2, Line 64, "isostatic" should read --isotactic--.

In Column 3, Line 1, "gram" should read --grams--.

In Column 4, Line 37, "butadiene,-1,3" should read --butadiene-1,3--.

Signed and Sealed this

Fourth Day of January 1977

[SEAL]

Attest:

RUTH C. MASON
*Attesting Officer*

C. MARSHALL DANN
*Commissioner of Patents and Trademarks*